Oct. 19, 1954
F. A. CARPENTER
2,692,095
CONVERTIBLE AIRPLANE AND HIGHWAY VEHICLE
Filed Aug. 1, 1952
3 Sheets-Sheet 1
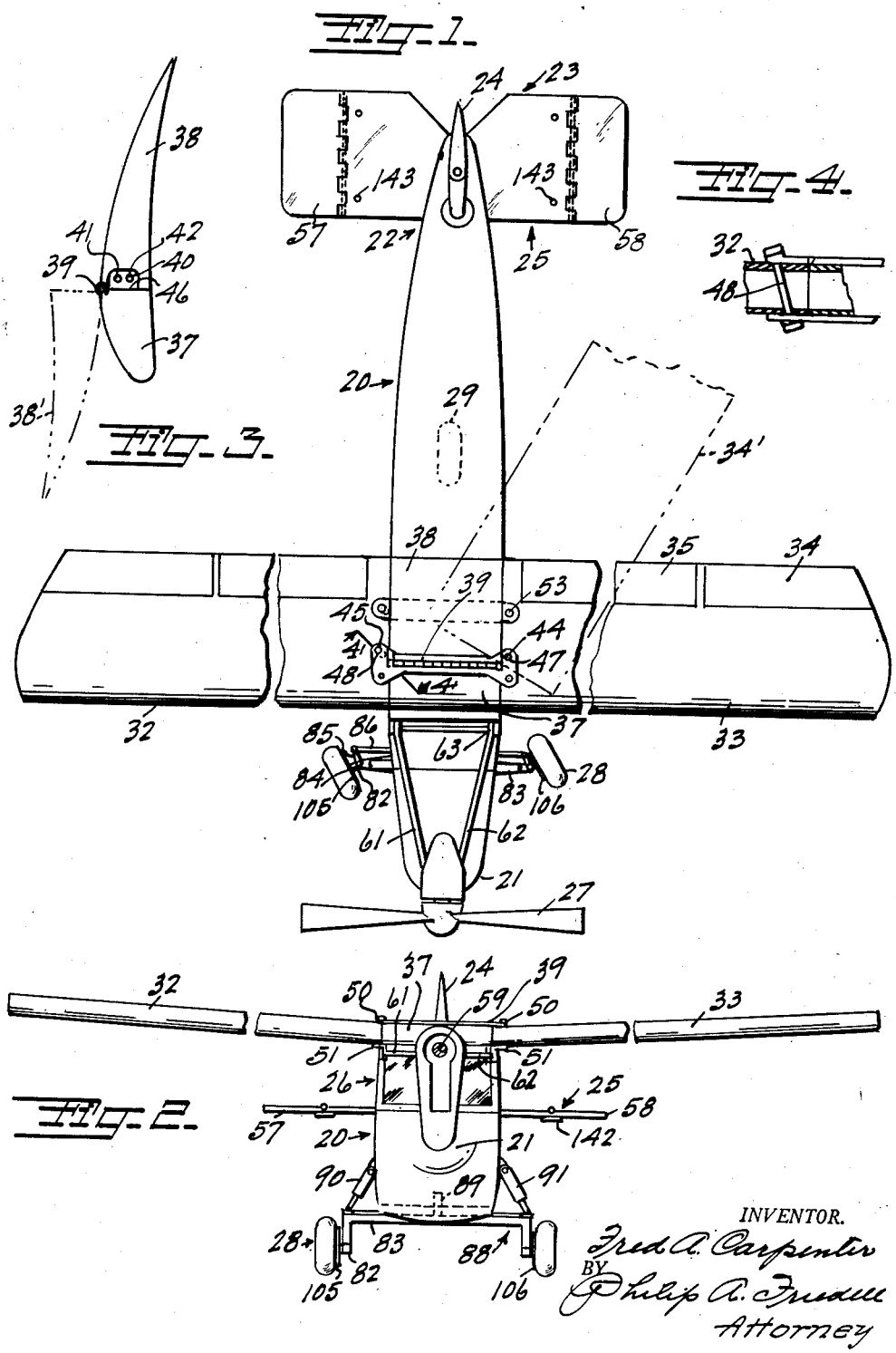
INVENTOR.
Fred A. Carpenter
BY Philip A. Fruedell
Attorney

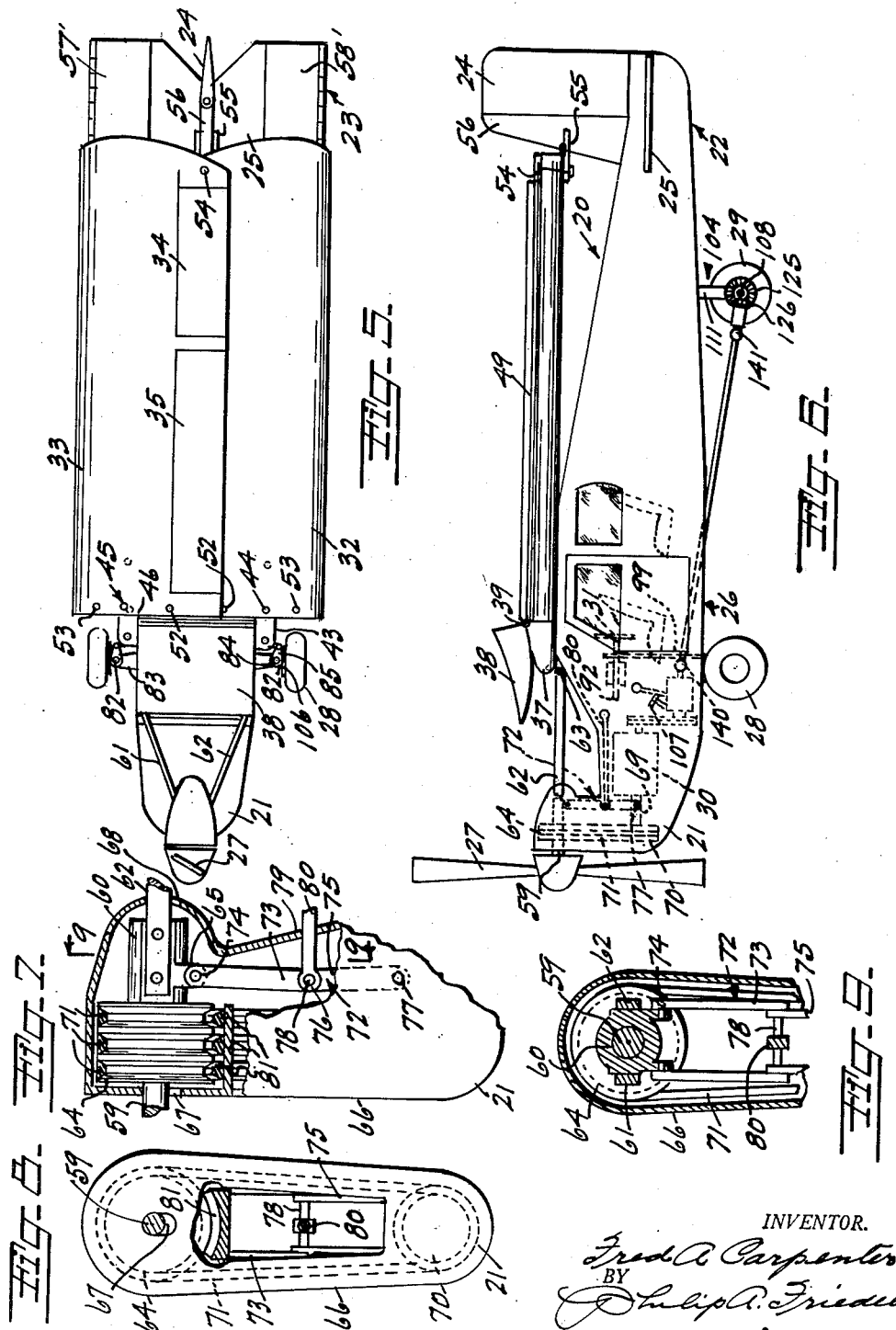

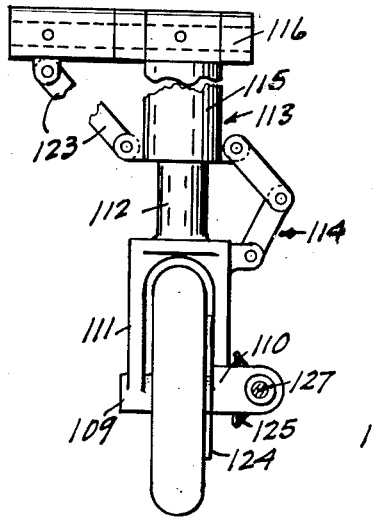

Patented Oct. 19, 1954

2,692,095

UNITED STATES PATENT OFFICE 2,692,095

CONVERTIBLE AIRPLANE AND HIGHWAY VEHICLE

Fred A. Carpenter, Berkeley, Calif.

Application August 1, 1952, Serial No. 302,222

12 Claims. (Cl. 244—50)

This invention relates to improvements in airplanes and provides a new and improved type of airplane which can be used for flight or for highway travel with the airplane being operated and controlled in a manner similar to that of the conventional automotive vehicle, the vehicle being steered in the conventional manner through the control wheel for the ailerons and elevators and which in this case controls the path of the landing wheels for steering, and as a vehicle driving is accomplished through the tail wheel or wheels.

With this invention it is possible to take off, fly, and land the airplane in the customary manner, and, if desired or advisable, quick stops can be made by disengaging and braking the propeller as soon as the landing wheels have grounded. In other words, it is possible to land and stop in a relatively short space as compared to that of the conventional airplane. After the airplane has landed it can be converted instantly to vehicular propulsion and steering for selection of the most suitable path for stopping.

Furthermore, this airplane can be maneuvered through vehicular propulsion and steering to the most desirable locations of paths after landing or previous to take-off, when the propeller locked against movement, making it possible to maneuver out of rocky, brushy and forested areas without danger of damage to the propeller.

After the airplane has landed, it can be compacted by folding the transverse projecting members such as the wings and elevators to fall within the roadway clearance limits which in most areas is limited to a width of eight feet.

The objects and advantages of the invention are as follows:

First, to provide an airplane with releasing and braking means for the propeller for quick stopping on landing and for maneuverability through obstructional areas and along highways when used as a highway vehicle.

Second, to provide an airplane with a retractable power driven tail wheel or wheels located at a point about midway between the tail and the cockpit or cabin to provide necessary loading for efficient traction.

Third, to provide an airplane with manually steerable landing wheels for ground maneuverability and for vehicular highway travel.

Fourth, to provide an airplane with wings which fold rearwardly in overlapping relation, and to provide for folding or retraction of any excess width portions of the elevators for vehicular travel of the airplane along a highway within the limits of roadway clearance for vehicles.

Fifth, to provide an airplane as outlined in which steering of the landing wheels is accomplished through the conventional flight control wheel, with the ailerons and flaps made inoperative when the wings are folded back for vehicular travel.

Sixth, to provide an airplane in which the power-driven tail wheel can be used as an assist in take-off or for maneuvering the airplane to a desirable take-off position.

Seventh, to provide an airplane as outlined which is convertible for flight or vehicular travel, at will.

In describing the invention reference will be had to the accompanying drawings, in which:

Fig. 1 is a top plan view of the invention in flight condition.

Fig. 2 is a front elevation of Fig. 1.

Fig. 3 illustrates on an enlarged scale the fold-forward intervening wing section which is provided to permit folding back of the wings.

Fig. 4 is an enlarged section taken on line 4—4 of Fig. 1 showing the angular pivot arrangement for causing the one wing to overlap the other when folded back.

Fig. 5 is a top plan view of the invention with the wings folded back and the elevators folded over for roadway clearance, and arranged for highway travel.

Fig. 6 is a side elevation of Fig. 5.

Fig. 7 is an enlarged view partly shown in section of the nose end of the airplane and illustrating the propeller release and braking mechanism.

Fig. 8 is a front view of Fig. 7, shown partly in section.

Fig. 9 is a rear view of Fig. 7, shown fragmentarily, and is taken on a line 9—9 of Fig. 7.

Fig. 10 is a front elevation of the tail wheel with combined retractive means and shock absorber and power drive.

Fig. 11 is a side elevation of Fig. 10.

Fig. 12 is an enlarged side elevation of the drive and control mechanism for the propeller and tail wheel.

Fig. 13 illustrates the slacking of the aileron cables when the wing is folded back, and drawn to an enlarged scale.

Fig. 14 is a side elevation of the steering control for the landing wheels for vehicular operation of the airplane.

Fig. 15 is a top plan view of the steering connections to the landing wheels for vehicular travel.

The invention includes a fuselage 20 having a nose 21, tail 22, and tail control structure 23 including a rudder 24 and elevators 25, a cockpit or cabin 26, propeller 27, landing wheels 28, tail wheel 29, engine 30, flight control 31, wings 32 and 33 including ailerons 34 and flaps 35, all of which are of substantially conventional design except as hereinafter set forth.

The airplane is of the high wing monoplane type to permit the wings to be pivoted to swing to folded position over the fuselage for maximum road clearance, and these wings include an intervening portion which is divided in two sections, a leading edge or forward section 37 and a trailing edge or rearward section 38, these two sections being substantially equal in width to the roof of the fuselage and being hinged together on a transverse axis as indicated at 39 to permit forward folding over of the rearward section as indicated at 38' in Fig. 3, the trailing edge section having a recess 40 at each end for the aileron and flap operating cables 41 and 42 in either operative or slacked condition.

The wings are pivoted preferably to the front spar 43 as indicated at 44 and 45, the pivots being located at an angle of approximately 45 degrees from the rearward corners 46 of the section 37 which brings the adjacent edges of the wings in abutment with the side edges of the sections 37 and 38 when the wings are extended, and in abutment with the rear edge of the front section when the wings are folded back.

The wings may both be mounted on angular pivots with both pivots sloped in the same direction, or as shown, the pivot 47 for one wing is mounted perpendicular so that the wing 33 swings about in a horizontal plane while the other wing 32 is mounted on a pivot 48 which slants diagonally outward from the corner 44 at an angle of approximately 45 degrees at a slight angle to the perpendicular, in the neighborhood of 10 degrees, to cause the wing to adjust to a normal plane when extended, and to pivot slightly upward at the trailing edge to lap over the wing 33 when swung back to the position shown in Figs. 5 and 6, with the trailing edge of wing 32 indicated at 49 which permits the wings to be folded within the roadway clearance limits for highway vehicular travel.

The pivots 47 and 48 are fixed in the plates 50 and 51, the wings being further secured by means of pins or bolts 52 and 53 to provide a rigid connection for the wings when extended. Securing means is provided for the wing tips as indicated at 54 for securing the wings in folded position, and includes a bracket 55 mounted or mountable on the rudder fin 56. As will be noted, it is necessary to release or remove the securing means 52 and 53 when the wings are to be folded, and to remove the securing means 54 when the wings are to be extended.

The rudder is conventionally formed as also are the elevators 25 except that in the event that the span of the elevators is in excess of permissible roadway clearance width, the end portions 57 and 58 are made retractable or foldable as by hinging so that they may be folded as indicated at 57' and 58' in Fig. 5.

The propeller 27 is supported on a shaft 59 which is rotatably mounted in a bearing 60 and which bearing is supported by rigid struts 61 and 62 which are rigidly fixed to the bearing, the other ends of the struts being pivoted to suitable brackets on the fuselage as indicated at 63. A multiple V-belt pulley 64 is fixed on the propeller shaft 59, and ears 65 are provided on the underside of the bearing 60 for the belt control means.

A drive housing 66 is mounted on or extends upwardly from the nose 21 of the airplane and its front wall is slotted as indicated at 67 and 68 to permit vertical oscillation of the shaft 59 for purposes to be described.

The engine 30 has a shaft 69 extending from each end and has a V-belt pulley at each end, the one at the forward end indicated at 70 being the driving member for the pulley 64 through the V-belts 71.

The release and braking mechanism for the propeller includes a toggle mechanism 72 including links 73 which have their upper ends pivoted to the ears 65 on the bearing 60 as indicated at 74, and having the other links 75 hinged to their other ends as indicated at 76, the lower ends of the links 75 being hingedly supported by the housing as indicated at 77.

This toggle mechanism is limited to forward movement to a point just over dead center, such as by a pin 78 passing through the housing or by other suitable means, and rearward movement is limited by the back wall 79 of the housing.

An operating rod 80 is pivotally connected to the intermediate joint of the toggle and extends into the cockpit or cabin for manual control.

A section of V-belt is provided for each groove in the pulley 64 as indicated at 81, and these sections are fixedly mounted in clearing relation to the grooves of the pulley when the pulley is in its raised position as shown in Fig. 7, and cooperate with the walls of the grooves when the pulley is lowered.

Thus, when the propeller is to be stopped quickly, the rod 80 is retracted, breaking the toggle, which lowers the bearing with its propeller shaft and propeller, slackening the belts, with the pulley immediately cooperating with the V-belt sections which immediately brake and stop the propeller.

The landing wheels 28 are mounted on knuckles 82 which are swiveled in the ends of the axle 83 as indicated at 84, and these knuckles are provided with an equalizing unit including the arms 85 and tie rod 86, similar to that of the conventional automotive vehicle, and one of these knuckle pins is provided with a steering arm 87, the entire front axle construction being similar to that of the conventional automobile front axle with the exception that a high clearance gap is provided through increased height of the knuckles, as indicated at 88. Another variation lies in the centralizing pilot 89 which retains the axle centered relative to the fuselage and limits movements to vertical, and in the shock absorbing struts 90 and 91 which may be of any suitable type mounted in any suitable manner.

The steering mechanism for the front wheels includes the flight control wheel 31 and shaft 92 supported in bearing 93 which is supported by the front wall 94 of the cockpit or cabin for limited arcuate movement of the shaft axis.

A drive sprocket is mounted on this shaft between the bearing 93 and the flight control drum 96 as indicated at 95, with the shaft slidable and non-rotatable in the drum and sprocket as indicated by the keyway 97.

A driven sprocket 98 is operatively connected to the drive sprocket through a bicycle type chain 99, this driven sprocket being mounted on a shaft 100 which in turn is supported by a bearing 101. A steering arm 102 is fixedly connected to the driven sprocket either directly or through the shaft 100, and has the steering rod 86 connected thereto preferably through a ball and socket joint indicated at 103.

The landing wheels 28 are provided with the conventional type of hydraulic brakes indicated at 105 and 106 and which are operated in the conventional manner by a brake pedal 107 in the cockpit.

The tail wheel 29 is supported by suitable retractable shock absorbing struts or by a single strut as indicated at 104 and as shown in Figs. 10 and 11, the wheel being mounted on an axle 108 which is rotatable in bearings 109 and 110 formed on the yoke 111 and which yoke is integral with the plunger 112 of the shock absorbing strut 113, this yoke being maintained in alignment with the longitudinal axis of the fuselage by the toggle connection 114 between the yoke and the cylinder 115, the upper end of the shock absorber being hinged in bearing 116 suitably supported. If the device is a combined shock absorbing strut and retractor, the bearing 116 will be mounted on a fixed support in the fuselage, however, if the retracting means is separate, the bearings 116 may consist of a yoke 117 formed at one end of a lever 118 which is shown pivotally supported at 119, with the other end 120 of the lever connected to the piston 121 of a hydraulic cylinder 122, or through any suitable arrangement.

The tail wheel is located about half way between the tail structure and the cockpit for application of suitable weight for efficient traction. It will be understood that the tail support is not limited to a single wheel of a single strut. Lateral struts 123 may be applied if further stabilization is found necessary.

The tail wheel is provided with a conventional hydraulic brake 124 which is made coincidently operable with the brakes on the landing wheels.

The driving mechanism for the tail wheel consists of a bevel gear 125 which is fixed on the shaft or axle 108, and an intermeshing bevel pinion 126 which is fixedly mounted on a shaft 127 which is rotatable in a bearing 128 which bearing is formed integral with the yoke 111.

The air flight and vehicular driving mechanism consists of the internal combustion engine 30 having a shaft extension at each end as indicated at 69 and 69' and has the drive pulley 70 for the propeller mounted on the forward end. This pulley is fixed on the forward shaft extension 69, no clutch being required, the slacked belts functioning as a released clutch. The principal function of the propeller shaft raising and lowering means is to provide braking action to stop the propeller and slack the belts to eliminate the necessity for a clutch.

Fixedly mounted on the rear shaft extension 69' is a drive pulley 129 for vehicular operation of the airplane. This pulley drives a pulley 133 through belts 134 which is rotatable on the driven shaft 135 of a selective transmission 136. This driven pulley 133 is provided with a clutch 137 which is controlled by the clutch pedal 138 in the cockpit.

The output shaft 139 of the transmission is coupled to the bevel pinion shaft 127 for the tail wheel through universal joints 140 and torque shaft 141.

The operation of the invention is as follows: For flight, the wings are rigidly connected as shown in Fig. 1, and the elevator flaps are extended and secured by suitable means such as by means of the tongues 142 and bolts 143.

The propeller is moved to its elevated position as indicated in Fig. 7. The transmission is set to neutral, or, if an assist is desired for quick take-off from a short runway, the transmission is set for minimum ratio to drive the tail wheel at maximum speed, and for which purpose a fluid clutch at 137 would prove most desirable because of delivery of maximum power and pick-up, in conformity with the assist of the propeller, and the instant ground speed. The transmission is returned to neutral following initial pick-up to substantially maximum speed of the tail wheel to prevent drag after the maximum speed is attained.

Following take-off, the tail wheel is retracted. Obviously the landing wheels will be steered through the flight control shaft and wheel, which offers an assist in turning or banking, as the wheels will be directed in the line of flight and thus offer no lateral resistance.

When landing, if a quick stop is esential because of a short landing strip, the tail wheel is lowered, and as soon as the landing wheels have grounded, the propeller is lowered and thereby stopped, and the brakes are applied to all three wheels, making a stop possible in the shortest possible distance.

When landing against high winds, the tail wheel is lowered to cause the wings to present a low or negative angle to prevent the airplane from bouncing back into the air, and the brakes applied, while for slow speed short landings the tail wheel is left in retracted position to present the wings at a high angle to provide support at the lowest possible air speed, the propeller being lowered and the brakes applied.

By leaving the propeller lowered, the tail wheel can be placed in gear through the transmission to drive the airplane vehicularly to any desired location while steering it through the landing wheels.

For vehicular traveling along a highway, the wings are folded back and secured as indicated in Figs. 5 and 6, and the elevators, if of excess width, are also retracted or folded over. The propeller is manually adjusted to diagonal position to provide maximum clearance, thus bringing the collapsed width of the airplane within road clearance limits.

The airplane is now driven in the conventional manner of any automotive highway vehicle.

It will be noted that when the wings are folded back, the aileron and flap cables are slackened as indicated at 144, thus creating no interference with steering through the landing wheels.

Thus a convertible airplane and automotive vehicle is provided permitting quick take-offs and landings, permits the airplane before take-off or after landing to be vehicularly driven to any desired location or position without aid by the propeller, and which can be folded into a compact unit transversely and within the width clearance limits of a roadway for driving on a highway in the same manner as an automobile, making it possible for the pilot to drive the airplane between his home and an airport or landing field.

I claim:

1. An airplane having a propeller, a propeller shaft, and power means for driving said propeller shaft, a drive pulley for said power means, and a driven pulley on said propeller shaft, and a belt operating about said pulleys, means manually operable for releasing said propeller from said power means and including braking means for instant braking and stopping of said propeller for quick stopping of said airplane on landing and for non-operation for vehicular travel, and comprising vertically adjustable mounting means for said propeller shaft and manually operable control means therefor for raising said shaft for driving of said driven pulley by said belt, and for lowering said shaft for freeing said belt for terminating driving, and said braking means comprising friction elements cooperative with said driven pulley in the lowered position of said shaft for securing said propeller against rotation.

2. A monoplane having wings, a propeller and driving means therefor, means for engaging and disengaging said driving means at will, a fuselage, said wings being pivoted to said fuselage with the pivot for one wing being disposed in an inclined position to the perpendicular with the inclination in a direction approximately 45 degrees to the longitudinal axis of the fuselage for overlapping of said one wing over the other when folded back over the fuselage, for maximum road clearance when operated as a highway vehicle.

3. A convertible airplane and highway vehicle comprising a high-wing monoplane having a fuselage, wings, a propeller, landing wheels and a tail wheel, and a power unit; said wings including an intervening portion including a leading edge section fixed to the roof portion of said fuselage, and a trailing edge section hinged to said leading edge section and foldable forwardly thereover, said wings being pivotally connected to said leading edge section and including an angular pivotal connection for abutment against the side edges of the leading edge section when extended, and to fold rearwardly together over said fuselage in overlapping relation for roadway width clearance for use as a highway vehicle, and means for selectively securing said wings in extended and folded positions at will.

4. A convertible airplane and highway vehicle comprising a high-wing monoplane having a fuselage, a tail structure, wings, a propeller, landing wheels, a tail wheel, and a power unit, and an operative connection between said propeller and said power unit and control means therefor, and an operative connection between said power unit and said tail wheel and manual control means therefor, steering means for said landing wheels; said propeller having a shaft, and raising and lowering means and manual control means therefor for said shaft, a driven pulley fixed on said shaft, a driving pulley on said power unit, a belt connecting said pulleys for driving said propeller when said shaft is in raised position, and brake means cooperative with said driven pulley when said shaft is lowered for stopping and holding said propeller against rotation, with the lowered pulley slacking said belt for terminating driving of the propeller by said power unit, and comprising said operative connection between said power unit and said propeller.

5. A high wing monoplane having wings foldable within roadway clearance limits and having a fuselage, a propeller, a power unit, an operative connection between said propeller and said power unit and including braking means and releasing means and manual control means therefor for stopping and braking said propeller at will, landing wheels and manual steering means therefor, and a tail wheel having a driving connection with said power unit and including manual control means for driving through said tail wheel at will, whereby said monoplane is convertible for flight or vehicular driving at will; said operative connection comprising a propeller shaft and a bearing therefor, struts fixed at one end to said bearing and extending rearwardly and having their other ends hingedly connected to said fuselage, a toggle link mechanism connecting pivotally between said bearing and a dependent point of support in said fuselage, a connection to said toggle link mechanism for manual control within said fuselage, a first V-belt pulley fixed on said shaft, a second V-belt pulley driven by said power unit, V-belts operating about said pulleys, V-belt sections fixedly mounted in cooperative relation beneath said first V-belt pulley for braking said propeller when said toggle link mechanism is retracted to lower said shaft to free the V-belts for non-driving of said propeller, for operation of said monoplane as a highway vehicle.

6. A high wing monoplane having wings foldable within highway clearance limits for vehicles and having a propeller and a power unit for driving said propeller and manual control means therefor, a tail wheel and landing wheels, manually controlled steering means for said landing wheels, and a driving connection between said power unit and said tail wheel and manual control means therefor for converting said monoplane at will for flight or highway travel; said driving connection between said tail wheel and said power unit comprising, a retractable shock absorbing strut having a yoke spanning said tail wheel, an axle rotatable in bearings on said yoke and fixed in said tail wheel and having a bevel gear fixed on one end, a pinion shaft, a bevel pinion fixed on said pinion shaft and meshing with said bevel gear, and a bearing on said yoke for said pinion shaft, a selective transmission having selective connection with said power unit and having an output shaft, and a connection including universal joints between said output shaft and said pinion shaft and simultaneously operating as a strut and tie for maintaining said tail wheel in relative position and in alignment with the longtudinal axis of said monoplane.

7. A convertible airplane and highway vehicle comprising a high wing monoplane having a fuselage, wings, a power unit, a propeller, landing wheels and a tail wheel and mounting means therefor, an operative connection between said power unit and said propeller, manual control means for disrupting said operative connection and simultaneously braking said propeller at will for instant stopping of said propeller, steering means for said landing wheels and control means therefor, a driving connection between said power unit and said tail wheel for vehicular driving of said airplane and manual control means for said driving connection for selective flight, or for highway travel without recourse to propeller operation; said wings including a central portion divided into two sections including a leading edge section fixedly mounted on said fuselage and a trailing edge section hinged to the leading edge section with the trailing edge section foldable over the leading edge section, two wings each having pivotal connection with the respective sides of said leading edge section adjacent to the rearward corner with the pivot for one wing located at an angle of approximately 45 degrees from the adjacent rearward corner of the leading edge section and inclined outwardly from the perpendicular to cause the trailing edge of said one wing to be elevated to overlap the trailing edge of the other wing when swung about their pivotal connections over the fuselage for contracting the width of the airplane within roadway clearance limits for operation as a highway vehicle, means for securing said wings in folded overlapping relation, and auxiliary means for securing said wings to said fuselage in juxtaposition with the sides of said central portion leading edge section when in extended position, and with the trailing edge section swingable rearwardly between the trailing edge portions of the said wings for continuity of the wing surfaces from wing tip to wing tip.

8. A monoplane selectively convertible for flight or highway travel comprising a fuselage, a propeller, a power unit, landing wheels and a tail wheeel, a pair of wings and a central wing portion, said central wing portion comprising a leading edge section fixed to the top of the fuselage, and a trailing edge section hinged to said leading edge section, said wings being pivoted to said fuselage in juxtaposition with the side edges of said leading edge and trailing edge sections to swing about the rearward edge of the leading edge section when the trailing edge section is folded over the leading edge section, and with one of the pivots angularly disposed to the vertical with the inclination projecting at an angle of substantially 45 degrees to the rearward side corner of the leading edge section to cause tilting of said one wing to overlap the other wing when folded back, to contract the folded width of the wings within highway travel clearance limits.

9. A structure as defined in claim 8, said propeller having a shaft having its axis substantially coincident with the undersurface of the said leading edge section for minimizing the necessary height of the monoplane in conjunction with a substantially large slow turning propeller.

10. A structure as defined in claim 9, a pulley fixed on said shaft, friction members in cooperative relation to said pulley, a drive pulley for said power unit, a belt operating over said pulleys, a support for said shaft and manual control means for raising and lowering said support for selectively tightening said belt for operation of said propeller for flight or for loosening said belt and braking and securing said propeller against rotation for highway travel.

11. A structure as defined in claim 10, an operative connection between said power unit and said tail wheel and manual control means therefor for selective idling of said tail wheel for flight operation and for driving said tail wheel for highway travel.

12. A structure as defined in claim 11, said operative connection between said power unit and said tail wheel comprising, a shock absorbing strut having said tail wheel mounted therein and supported by said fuselage, a torque shaft connecting said power unit and said tail wheel for maintaining alignment of the tail wheel and individual driving and clutch means comprising said manual control means for said operative connection.

References Cited in the file of this patent

UNITED STATES PATENTS

| Number | Name | Date |
|---|---|---|
| 1,429,730 | Gill | Sept. 19, 1922 |
| 1,431,683 | Ramsay | Oct. 10, 1933 |
| 1,530,232 | Buttner | Mar. 17, 1925 |
| 1,711,637 | Fairchild | May 7, 1929 |
| 1,816,653 | Nelsch | July 28, 1931 |
| 1,942,235 | Boggio | Jan. 2, 1934 |
| 1,998,148 | Vieriu | Apr. 16, 1935 |

FOREIGN PATENTS

| Number | Country | Date |
|---|---|---|
| 274,151 | Great Britain | July 11, 1927 |
| 350,047 | Great Britain | June 11, 1931 |
| 692,060 | Germany | June 11, 1940 |